(12) United States Patent
Kim et al.

(10) Patent No.: US 11,437,713 B2
(45) Date of Patent: Sep. 6, 2022

(54) ANTENNA ASSEMBLY

(71) Applicant: KMW INC., Hwaseong-si (KR)

(72) Inventors: In-ho Kim, Hwaseong-si (KR);
Hyoung-seok Yang, Hwaseong-si (KR);
Seong-man Kang, Hwaseong-si (KR)

(73) Assignee: KMW INC., Hwaseong-si (KR)

( * ) Notice: Subject to any disclaimer, the term of this patent is extended or adjusted under 35 U.S.C. 154(b) by 543 days.

(21) Appl. No.: 16/522,667

(22) Filed: Jul. 26, 2019

(65) Prior Publication Data

US 2019/0348752 A1 Nov. 14, 2019

Related U.S. Application Data

(63) Continuation of application No. PCT/KR2018/001182, filed on Jan. 26, 2018.

(30) Foreign Application Priority Data

Jan. 26, 2017 (KR) ........................ 10-2017-0012671

(51) Int. Cl.
*H01Q 1/24* (2006.01)
*F16H 19/04* (2006.01)
(Continued)

(52) U.S. Cl.
CPC ............. *H01Q 1/246* (2013.01); *F16H 19/04* (2013.01); *H01Q 1/1264* (2013.01); *H01Q 1/42* (2013.01);
(Continued)

(58) Field of Classification Search
CPC ........ H01Q 1/246; H01Q 21/205; H01Q 3/06; H01Q 3/04; H01Q 1/125
See application file for complete search history.

(56) References Cited

U.S. PATENT DOCUMENTS

| 5,969,689 | A | * | 10/1999 | Martek | .................... H01Q 1/42 343/758 |
| 7,015,871 | B2 | * | 3/2006 | Gotti | ..................... H01Q 1/246 343/882 |

(Continued)

FOREIGN PATENT DOCUMENTS

| JP | H11-353824 A | 12/1999 |
| JP | 2005-184769 A | 7/2005 |

(Continued)

OTHER PUBLICATIONS

International Search Report for PCT/KR2018/001182 dated May 21, 2018 and its English translation.

(Continued)

*Primary Examiner* — Ab Salam Alkassim, Jr.
(74) *Attorney, Agent, or Firm* — Insight Law Group, PLLC; Seung Lee

(57) ABSTRACT

An antenna assembly including an antenna reflector steering mechanism is disclosed. A reflector steering structure for adjusting the horizontal azimuth of a reflector includes a drive motor disposed on the rear surface of the reflector, a planet gear rotated by the drive motor, and a sectorial rack gear engaged with the planet gear and fixed to a support shaft, thereby achieving a compact design of an entire antenna structure. Further, by applying a structure with enhanced electrical insulation to rolling and slide contact portions of the drive unit and a portion undergoing change in contact pressure, radio performance of the antenna system may be prevented from changing according to steering of the reflector.

16 Claims, 7 Drawing Sheets

(51) Int. Cl.
*H01Q 1/42* (2006.01)
*H01Q 3/04* (2006.01)
*H01Q 19/10* (2006.01)
*H01Q 21/20* (2006.01)
*H01Q 1/12* (2006.01)
*H01Q 3/06* (2006.01)

(52) U.S. Cl.
CPC ................ *H01Q 3/04* (2013.01); *H01Q 3/06* (2013.01); *H01Q 19/104* (2013.01); *H01Q 21/205* (2013.01)

(56) References Cited

U.S. PATENT DOCUMENTS

| | | | | |
|---|---|---|---|---|
| 7,145,515 B1* | 12/2006 | Kim | ............ | H01Q 1/246 343/726 |
| 8,743,008 B2* | 6/2014 | Kim | ............ | H01Q 3/06 343/882 |
| 9,306,278 B2* | 4/2016 | Lever | ............ | H01Q 3/04 |
| 9,647,334 B2* | 5/2017 | Lanciault | ............ | H01Q 19/134 |
| 9,660,323 B2* | 5/2017 | Au | ............ | H01Q 1/1264 |
| 10,276,933 B1* | 4/2019 | Chukka | ............ | H01Q 3/06 |
| 2004/0113861 A1* | 6/2004 | Jackson | ............ | H01Q 21/28 343/882 |
| 2006/0192717 A1* | 8/2006 | Kim | ............ | H01Q 3/20 343/766 |
| 2007/0262911 A1* | 11/2007 | Kim | ............ | H01Q 3/20 343/757 |
| 2009/0135074 A1* | 5/2009 | Yang | ............ | F16H 1/227 343/766 |
| 2009/0231224 A1* | 9/2009 | Felstead | ............ | H01Q 3/08 343/882 |
| 2012/0280874 A1* | 11/2012 | Kim | ............ | H01Q 3/06 343/763 |
| 2013/0120202 A1* | 5/2013 | Lever | ............ | H01Q 3/04 343/766 |
| 2014/0333500 A1* | 11/2014 | Moon | ............ | H01Q 21/08 343/758 |
| 2016/0211576 A1* | 7/2016 | Vassilakis | ............ | H01Q 1/1228 |
| 2016/0365624 A1* | 12/2016 | Maley | ............ | H01Q 21/205 |
| 2018/0067293 A1* | 3/2018 | Tommei | ............ | F24S 23/77 |
| 2020/0028245 A1* | 1/2020 | Duan | ............ | H01Q 1/125 |
| 2021/0050664 A1* | 2/2021 | Lin | ............ | H01Q 3/02 |
| 2022/0094051 A1* | 3/2022 | Ameer P | ............ | H01Q 3/01 |

FOREIGN PATENT DOCUMENTS

| | | |
|---|---|---|
| JP | 2006-96243 A | 4/2006 |
| KR | 10-2007-0049459 A | 5/2007 |
| KR | 10-0774262 B1 | 11/2007 |
| KR | 10-2009-0130812 A | 12/2009 |
| KR | 10-0960003 B1 | 5/2010 |
| KR | 10-2013-0115632 A | 10/2013 |
| WO | 2005/062419 A1 | 7/2005 |

OTHER PUBLICATIONS

Japanese office action dated Aug. 25, 2020 for Japanese Application No. 2019-540085.
The office action dated Jun. 11, 2020 for Chinese Application No. 20188000847.6.

* cited by examiner

ANTENNA ASSEMBLY

TECHNICAL FIELD

This disclosure relates to an antenna assembly of a mobile communication base station, and more particularly, to an individual rotary sector antenna assembly.

BACKGROUND ART

The statements in this section merely provide background information related to the present disclosure and may not constitute prior art.

In a mobile communication system, the position of an antenna mounted on a base station is an important factor for determining coverage of a cell in designing the cell. The antenna is installed on the rooftop of a building or a tower for the base station near the city center in order to maximize the range of radio waves.

In recent years, it is necessary to adjust the orientation of an antenna reflector in order to improve the call quality in an area where a large amount of calls is generated due to change in arrangement of buildings around the base station or events. The orientation is adjusted considering all settings of the base stations including the interference levels of neighboring base stations.

For the horizontal azimuth angle of the antenna reflector, when electrical horizontal steering is performed to control and adjust the phase of a signal transmitted from each radiating element, scan loss is produced and side lobe increases. Therefore, in performing horizontal steering, it is desirable to adjust the antenna reflector mechanically. As a mechanical steering mechanism, a device for pivoting the reflector and a shaft connected to the reflector has been mainly employed. Such a structure is disclosed in U.S. Pat. Nos. 7,145,515 and 7,015,871 and Korean Patent No. 0774262.

However, the reflector is heavy, and the shaft for fixing the reflector is eccentrically located on the back surface of the reflector. In order to rotate the shaft and the reflector, a drive unit having a considerable capacity is required. Such a drive unit occupies a large space for installation. Also, in the case of urban buildings or small towers, it is expected that telecommunication operators will have to establish communication networks using compact and lightweight antennas that do not interfere with the aesthetics of the city.

To address this issue, a technique of installing three antennas on a single tower and covering the same with a cylindrical canister has been employed, and there is a need for an antenna reflector steering mechanism capable of pivoting the reflector with sufficient force while occupying a small installation space.

DISCLOSURE

Technical Problem

It is an object of the present disclosure to provide an antenna assembly having a reflector steering structure that provides sufficient power to steer a reflector, minimizes installation space and does not degrade radio performance of a base station antenna system.

More specifically, it is an object of the present disclosure to provide an antenna assembly having a reflector steering structure that provides smooth steering in adjusting the horizontal azimuth angle of the reflector by minimizing the weight of a pivoting part by allowing only the reflector to pivot about a rotary shaft supporting the reflector with the rotary shaft remaining stationary, and has a drive unit in which electrical properties of operating components do not cause an increase in passive intermodulation distortion (PIMD).

Technical Solution

In accordance with one aspect of the present invention, provided is an antenna assembly having an antenna reflector steering structure, the antenna assembly including a reflector having an antenna element disposed on a front surface thereof; a support shaft spaced apart from the reflector; and an antenna reflector steering mechanism configured to pivot the reflector about the support shaft, wherein the antenna reflector steering mechanism includes a sectorial rack gear coupled to the support shaft and provided with a sectorial gear portion on an outer circumferential surface thereof; a planetary gear engaging with the sectorial rack gear; a gear housing provided with at least one boss arranged on one side thereof and rotatably connected to the support shaft and a fixing portion arranged on an opposite side thereof and coupled with a rear surface of the reflector; and a drive motor fixed to the gear housing and connected to the planetary gear to revolve the planetary gear around the support shaft along the sectorial rack gear.

The antenna reflector steering mechanism may include a steering mechanism unit arranged on an upper portion of the reflector with respect to a height of the reflector; and a steering mechanism unit arranged on a lower portion of the reflector.

The sectorial rack gear may include a protrusion at both ends of the sectorial gear portion, wherein the protrusion may be configured to prevent the planetary gear from being separated.

The planetary gear may include an insulation band surrounding a circumferential surface thereof, wherein the insulation band may be flexible so as to be deformed along a curved profile of engaged portions of the planetary gear and the sectorial rack gear.

The insulation band may be formed of a material selected from the group consisting of fluorine resin and ultra-high molecular weight polyethylene.

The sectorial gear and the planetary gear may be formed of aluminum, and a surface thereof is anodized.

The gear housing may be formed in a clevis shape such that two bosses disposed on one side are rotatably connected to the support shaft and the sectorial rack gear is accommodated between the two bosses.

The gear housing may further include an insulation insert and an insulation tape for electrically insulating the fixing portion when the fixing portion is fixed to the rear surface of the reflector.

The boss of the gear housing may include three or more columns of grooves formed on an inner circumferential surface of the boss and arranged in an axial direction of the boss; and a plurality of ball bearings of a nonconductive material accommodated in the grooves.

The ball bearings may be formed of a material selected from the group consisting of a polymer material and a ceramic material.

A size and number of the ball bearings may be determined so as to serve as axial and radial bearings to reduce rotational resistance of the gear housing when the gear housing is pivoted about the support shaft.

The support shaft may include an upper shaft; a lower shaft; and an intermediate shaft disposed between the upper shaft and the lower shaft and coupled to the upper shaft and the lower shaft by a coupling.

The coupling electrically insulates the shafts connected to both sides thereof.

The drive motor may be a direct current (DC) motor.

The drive motor may include at least one rotary encoder, wherein the drive motor may be controlled by a remote electric tilt (RET) controller.

The antenna assembly may include an auxiliary bracket including a body allowing the support shaft to pass therethrough and an arm extending from both sides of the body to lateral sides of the reflector such that ends thereof are fixed to the reflector.

In accordance with another aspect of the present invention, provided is a mobile communication base station antenna including three antenna assemblies of claim 1, wherein each of the three antenna assemblies is disposed in each sector of a circumference divided into three sectors.

Advantageous Effects

According to the present disclosure, a reflector steering structure for adjusting the horizontal azimuth of a reflector includes a drive motor disposed on the rear surface of the reflector, a planetary gear rotated by the drive motor, and a sectorial rack gear engaged with the planetary gear and fixed to a support shaft, thereby achieving a compact design of an entire antenna structure.

Further, by applying a structure with enhanced electrical insulation to rolling and slide contact portions of the drive unit and a portion undergoing change in contact pressure, radio performance of the antenna system may be prevented from changing according to steering of the reflector.

BEST MODE

Figure 1:
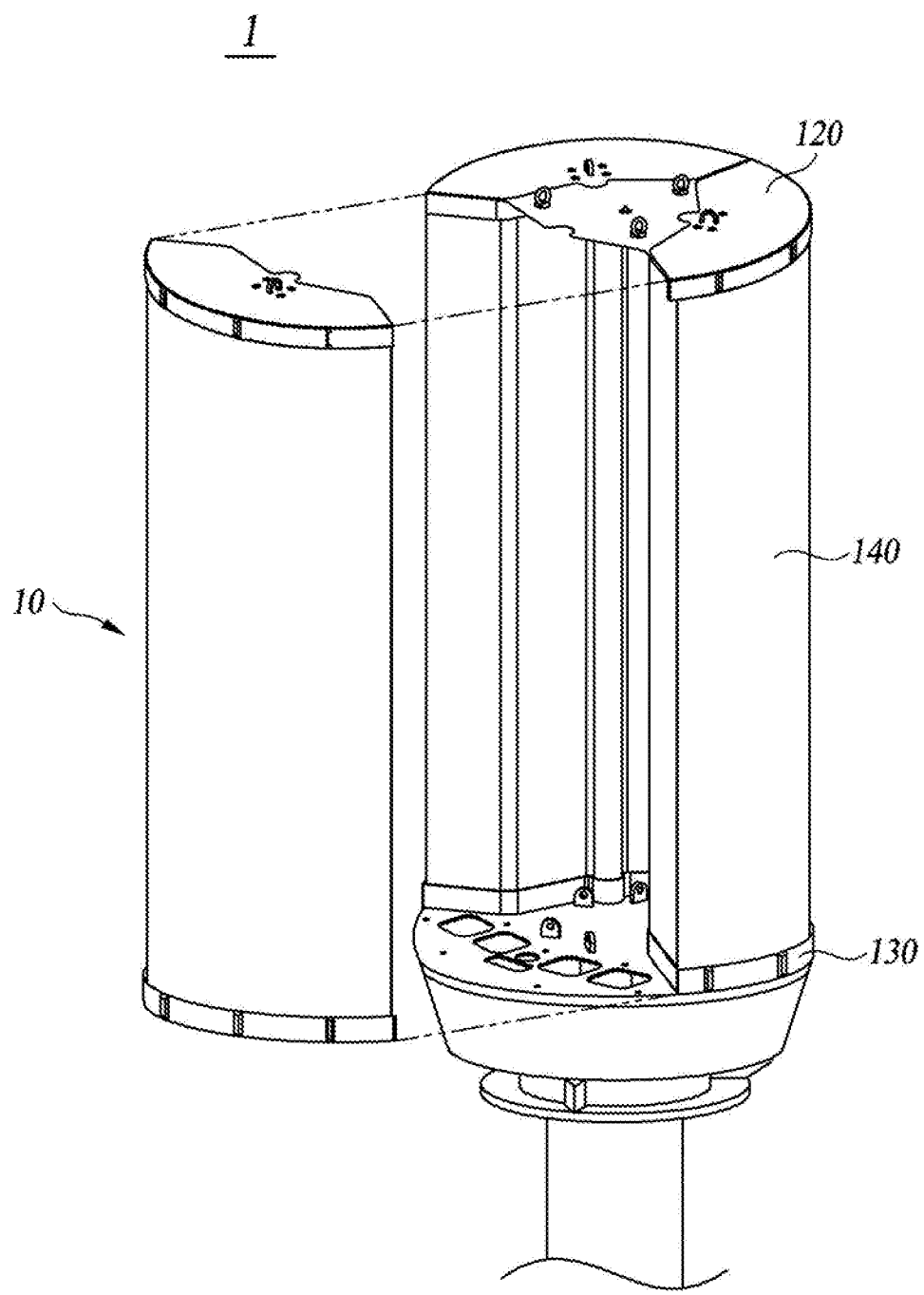
FIG. 1 is an overall perspective view of a 3-sector antenna according to an embodiment of the present disclosure.

Hereinafter, some embodiments of the present disclosure will be described in detail with reference to the accompanying drawings. It should be noted that, in adding reference numerals to the constituent elements in the respective drawings, like reference numerals designate like elements, although the elements are shown in different drawings. Further, in the following description of the present disclosure, a detailed description of known functions and configurations incorporated herein will be omitted when it may make the subject matter of the present disclosure rather unclear.

Additionally, various terms such as first, second, A, B, (a), (b), etc., are used solely for the purpose of differentiating one component from the other but neither imply nor suggest the substances, order or sequence of the components. Throughout this specification, when a part "includes" or "comprises" a component, the part may further include other components, and such other components are not excluded unless there is a particular description contrary thereto. Terms such as "unit," "module," and the like refer to units for processing at least one function or operation, which may be implemented by hardware, software, or a combination thereof.

FIG. 1 is an overall perspective view of a 3-sector antenna according to an embodiment of the present disclosure.

Referring to FIG. 1, a 3-sector antenna 1 according to the embodiment of the present disclosure has a long cylindrical structure. Antenna reflectors 110 equally divide the circumference of the cylinder into three sectors, and the three sectors are arranged in the longitudinal direction of the cylinder. Each antenna reflector 110 is disposed in each radome 140 that surrounds a central pole 160 arranged at the center of the cylinder. A ground line for absorbing lightning strikes passes through the central pole, and the radomes form a cylindrical shape as a whole when mounted.

For simplicity, the description will be given on the basis of one sector 10 in the structure of the 3-sector antenna 1, but the present disclosure is not limited thereto.

Figure 2:
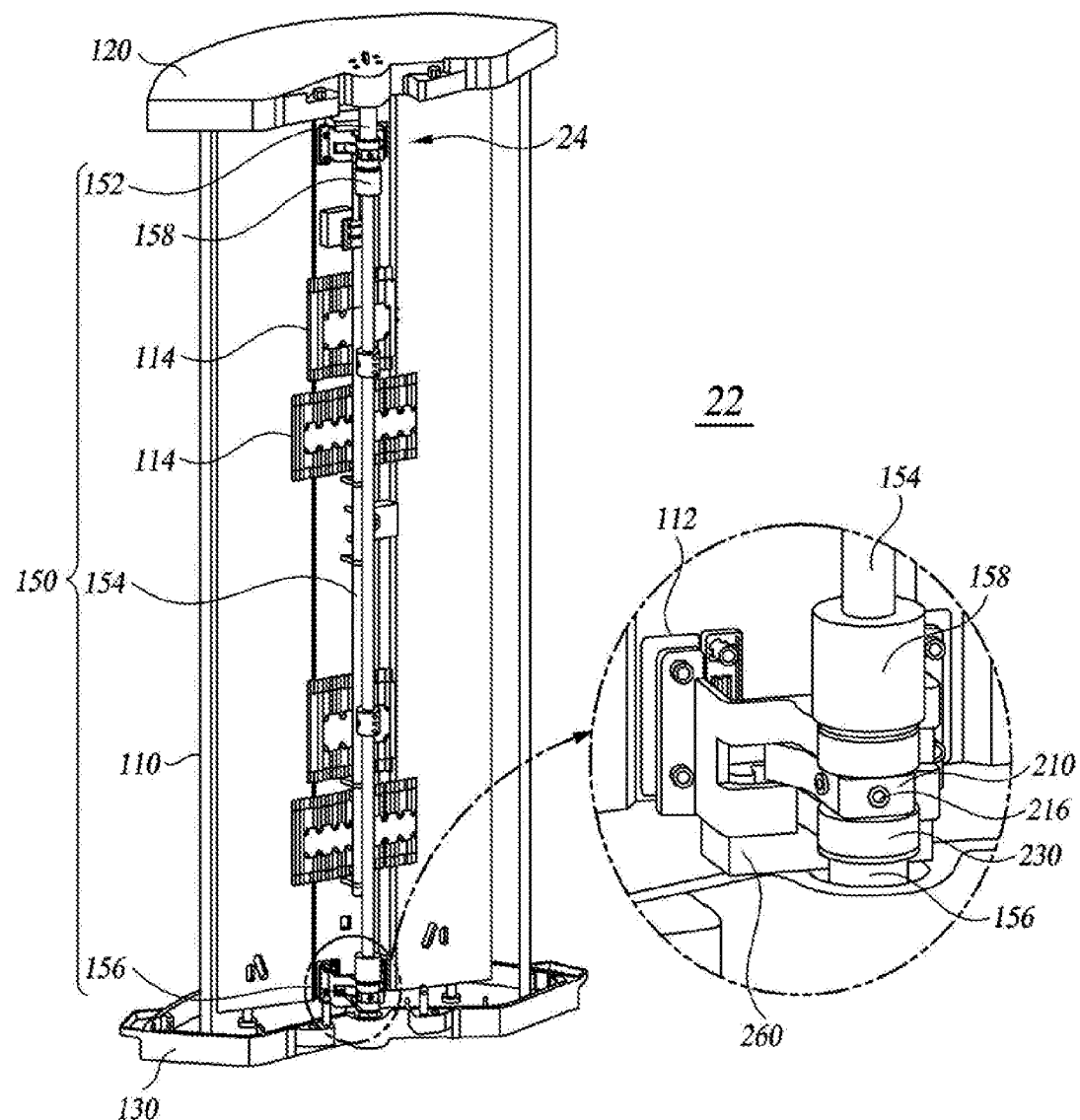
FIG. 2 is a detailed view showing an internal structure of a single sector and a reflector steering mechanism according to an embodiment of the present disclosure.

FIG. 2 is a detailed view showing an internal structure of a single sector and a reflector steering mechanism according to an embodiment of the present disclosure.

Referring to FIG. 2, a single sector 10 according to the embodiment of the present disclosure includes a reflector 110, a support shaft 150, a first reflector steering mechanism 22, a second reflector steering mechanism 24, an upper cover 120, a lower cover 130, and a radome 140.

The reflector 110 includes various antennas, which are arranged on the front surface of the reflector, for transmitting and receiving radio signals and a signal conditioning part 114 for controlling the transmitted and received radio signals which is arranged on the rear surface of the reflector. The signal conditioning component 114 may be a phase shifter or a distribution/combination device for distribution and combination of transmitted and received signals of internal devices and radiating elements. The various transmitted/received signals are connected to a signal transmission line (not shown), such as a coaxial cable, and are connected to the outside of the antenna structure through the lower cover 130.

The support shaft 150 is fixed to the upper cover 120 and the lower cover 130. The support shaft 150 includes an upper shaft 152, an intermediate shaft 154, a lower shaft 156, and a coupling 158 for connecting the upper and lower shafts with the intermediate shaft 154. The upper shaft 152 is fixed to the upper cover 120 and the second reflector steering mechanism 24 is disposed between the upper shaft 152 and the rear surface of the reflector 110. The lower shaft 156 is fixed to the lower cover 130 and the first reflector steering mechanism 22 is disposed between the lower shaft 156 and the rear surface of the reflector 110. The intermediate shaft 154 is connected to the upper shaft 152 and the lower shaft 156 by the coupling 158.

The reflector steering mechanisms 22 and 24 are arranged close to both ends in the height direction of the reflector 110 and are configured to pivot the reflector 110 around the fixed support shaft 150. Although the assembly of the reflector 110 is a weight, lateral stiffness of the reflector 110 is not high. The reflector steering mechanisms 22 and 24 pivot simultaneously at both ends of the reflector 110 so as not to apply torsional load to the reflector 110. In addition, the weight of the support shaft 150, which is required to have high rigidity to support the offset load of the reflector 110 eccentrically mounted toward the front, can be excluded from the pivot unit, and accordingly a compact design of the drive unit may be obtained.

Each of the reflector steering mechanisms 22 and 24 includes a sectorial rack gear 210, a planetary gear 220, an insulation band 240, a driver motor 260, a gear housing 230, and a remote electrical tilt (RET) controller (not shown). At least one rotary encoder (not shown) configured to provide a pivot angle by steering to the RET controller may be included in the first or second reflector steering mechanism 22, 24. In one embodiment, only the first reflector steering mechanism 22 includes a rotary encoder, and thus the angular positions of the first reflector steering mechanism 22 and the second reflector steering mechanism 24 are controlled based on the rotary encoder. The detailed description will be given based on the first reflector steering mechanism 22 for convenience.

Figure 3:
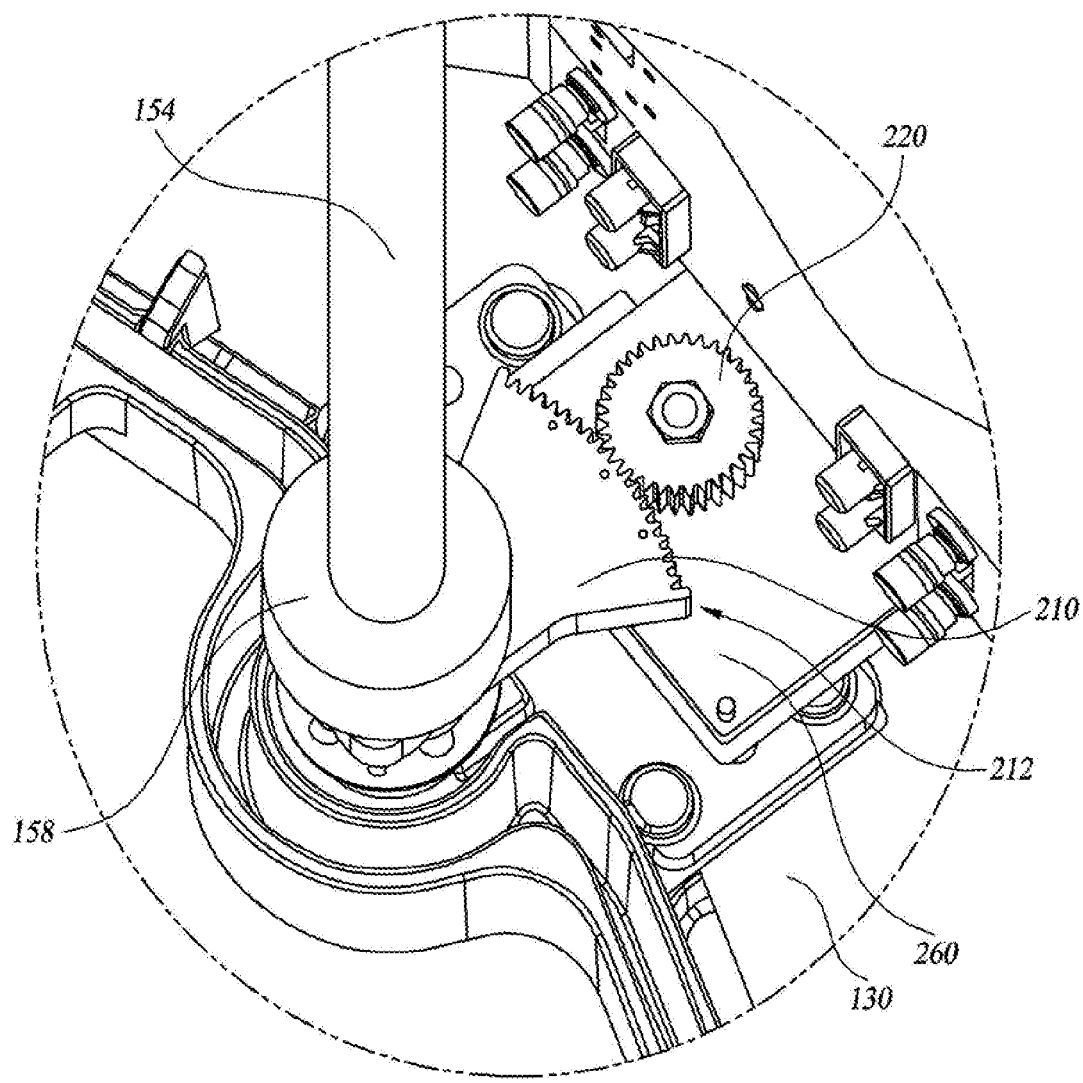
FIG. 3 is a perspective view showing main parts of a reflector steering mechanism according to an embodiment of the present disclosure, with a gear housing removed.

FIG. 3 is a perspective view showing main parts of a reflector steering mechanism according to an embodiment of the present disclosure, with a gear housing removed.

Referring to FIG. 3, the sectorial rack gear 210 is formed such that one side thereof is axially coupled to the lower shaft 156, and the opposite side thereof is provided with a rack gear portion having an arc shape about the rotation axis of the lower shaft 156. The structure to be actually coupled with the lower shaft 156 has one to three set screw holes 214 extending radially outward in the inner circumferential surface of a hole formed to allow the lower shaft 156 inserted thereinto. Thus, the structure is coupled to the lower shaft 156 by set screws. Alternatively, the structure may have a C-clamp shape that has a cut-open portion on the opposite side to the side on which the rack gear portion is formed, and is configured to reduce the diameter of the hole. It will be apparent to one of ordinary skill in the art that the sectorial rack gear 210 and the lower shaft 156 can be axially coupled in various manners.

Figure 4:
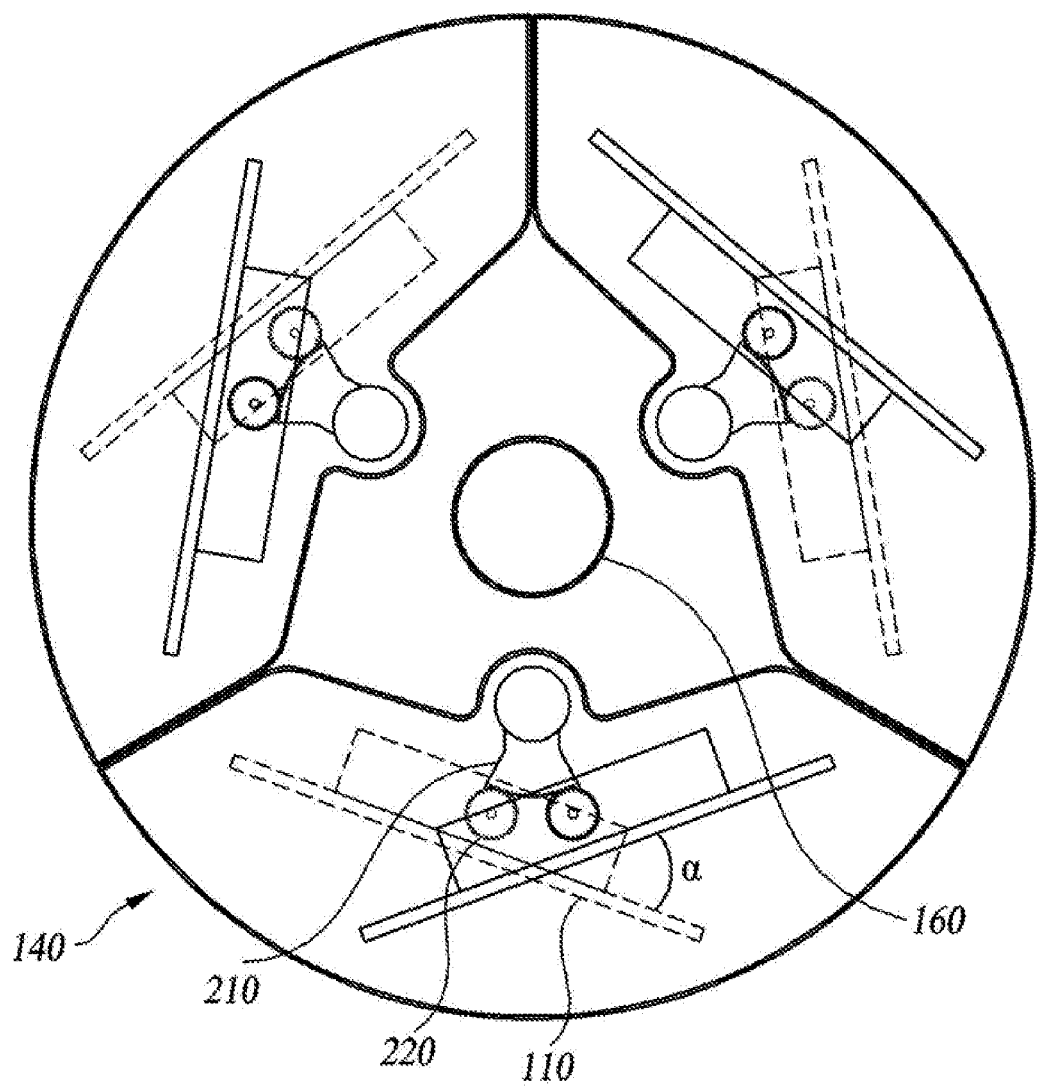
FIG. 4 is a conceptual diagram illustrating a pivot range of a 3-sector antenna according to an embodiment of the present disclosure.

FIG. 4 is a conceptual view illustrating a pivot range of a 3-sector antenna according to an embodiment of the present disclosure.

Referring to FIG. 4, the reflector 110 is surrounded by the radome 140, which is a casing of the antenna, and is pivoted around the support shaft 150. Each reflector 110 of the 3-sector antenna 1 has a pivot range of, for example, 50 degrees, usually 40 degrees. In one embodiment, the antenna consists of three sectors 10, but the number of sectors of the antenna may be changed depending on the specifications of the antenna or the place where the antenna is installed.

In one embodiment, the positions of the support shaft 150 and the reflector 110 are selected such that the diameter of the 3-sector antenna 1 is reduced and the wide width of the reflector 110 of each sector 10 is secured while maintaining a necessary pivot range of the reflector 110. For example, in one embodiment, when the radius of the 3-sector antenna 1 is 10, the radial position of each support shaft 150 may be 4 from the central axis of the 3-sector antenna 1, the distance between the support shaft 150 and the reflector 110 may be 2, and the lateral width of the reflector 110 may be 11.

The center of pivot of the reflector 110 is selected as a position optimized between the following two cases in consideration of the diameter of the antenna 1 and the pivot range of the reflector 110. When it is assumed that the center of rotation of the reflector 110 is located at the position of the reflector 110, the pivot range is determined by the radial width of the radome 140. When it is assumed that the center of rotation of the reflector 110 is located at the center pole 160 of the antenna, the pivot range of the reflector 110 is determined by the lateral width of the reflector 110 and the radial position of the reflector 110 from the center pole 16.

The reflector steering mechanisms 22 and 24 are configured to minimize the required power of the drive motor 260 and employ the driving parts in a compact size. Referring again to FIG. 3, the sectorial rack gear 210 having a rack gear formed only in a sectorial area is fixed to the lower shaft 156. The radius of the sectorial rack gear 210 may be increased and the planetary gear 220 may be arranged closer to the rear surface of the reflector 110 to increase the reduction ratio of the gear and to miniaturize the entire drive apparatus.

The sectorial rack gear 210 may be formed of a metal material so as to have sufficient strength for pivoting the assembly of the reflector 110, which is heavy. Preferably, the sectorial rack gear is formed of a hard anodized aluminum material to ensure that the electrical or frequency characteristics of the antenna are not deteriorated by the driving components. When the electrical characteristics are considered alone, a plastic material may be employed. However, the size is inevitably increased in order to obtain the required rigidity. Considering the outdoor temperature environment where the antenna is used, the plastic material is likely to cause a problem in terms of durability.

It is important that mobile base station antennas ensure extremely low noise in an operating frequency band. Accordingly, it is necessary to minimize the PIMD caused not only by the mechanical connection parts of various RF connection elements, but also inside the parts that make contact with metal and the parts coated with dissimilar metals. Particularly, a radio signal having a high frequency and a high energy may cause intermediate frequencies by mixing between multiple frequencies due to nonlinearity of voltage and current at these contact portions. The signal quality of the antenna may be greatly degraded by an intermediate frequency close to the frequency of the main signal among the intermediate frequencies. Therefore, the reflector steering mechanisms 22 and 24 need to be designed so as to minimize the PIMD.

The sectorial rack gear 210 and the planetary gear 220 of the reflector steering mechanism according to an embodiment are made of a hard anodized aluminum material without ferromagnetic or paramagnetic characteristics, which may cause the PIMD. The surface of the anodized gear is given increased surface hardness and electrically insulated, but both sides of the engaged gear portions having the same surface hardness may be worn due to persistent friction therebetween. Also, considering the thickness of the anodized layer, which is usually up to about 50 μm, mixing of high-frequency signals, which causes an increase in PIMD, may occur at the contact portions. In order to address this issue, an insulation band 240 is inserted between the engaged portions of the gears in one embodiment of the present disclosure.

Figure 5:
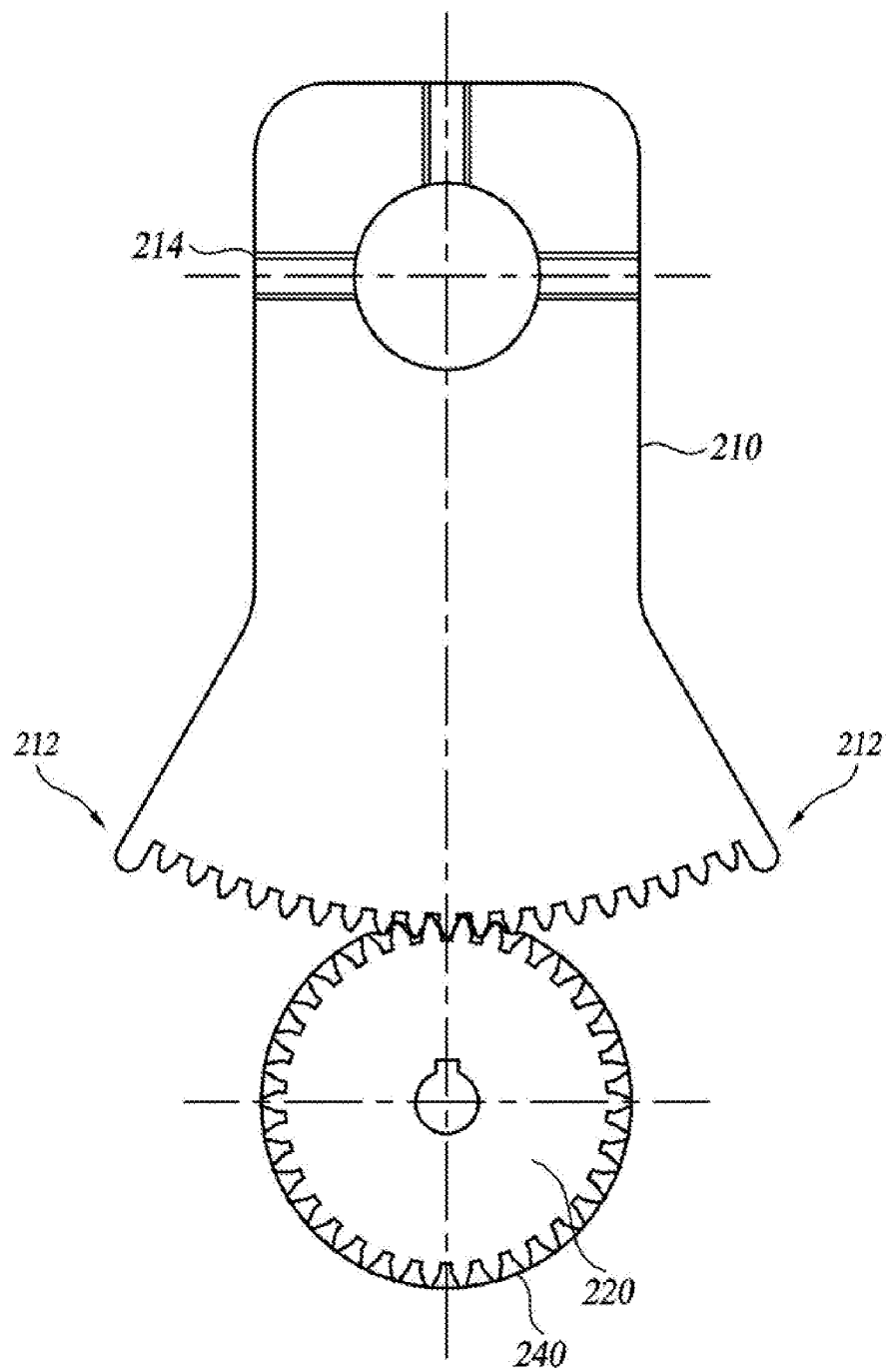
FIG. 5 is a conceptual view showing a sectorial rack gear, a planetary gear, and an insulation band disposed therebetween according to an embodiment of the present disclosure.

FIG. 5 is a conceptual view showing a sectorial rack gear, a planetary gear, and an insulation band disposed therebetween according to an embodiment of the present disclosure.

Referring to FIG. 5, an insulation band 240 is disposed between the sectorial rack gear 210 and the planetary gear 220 to prevent coupling of high-frequency signals. The insulation band 240 may have a width greater than that of the planetary gear 220 and be arranged to loosely surround the outer circumferential surface of the planetary gear 220. With the sectorial rack gear 210 engaged with the planetary gear 220, the gap is insulated along the curved portion between the engaged portions. At this time, the insulation band may be inserted into the outer surface of the planetary gear 220 except for the engaged portion so as to have a thickness and a size corresponding to intermediate fitting. Axial displacement of the insulation band 240 may be prevented by the gear housing 230. While a circular band is described in one embodiment as being provided, embodiments are not limited thereto. Other structures capable of achieving insulation may be employed. The insulation band 240 also serves as an insulator for blocking noise and intermediate frequency components transmitted from the DC motor axially-coupled with the drive gear 220. The insulation band 240 may be formed of a material such as fluorine resin or ultra-high molecular weight polyethylene.

The drive unit of the reflector steering mechanisms 22 and 24 is configured, including the anodized sectorial rack gear 210, the planetary gear 220 and the insulation band 240 for insulating the engaged portions therebetween, the motor 260 and the lower shaft 156 may be completely insulated up to a high-frequency signal band, and the PIMD caused by the drive unit may be minimized Fluorine resin or ultra-high molecular weight polyethylene is a material with a very low coefficient of friction and high durability. The reflector steering mechanisms 22 and 24 according to the embodiment of the present disclosure in which pivot movement is intermittently performed only to a small degree as needed may provide electric insulation with sufficient durability for a long period of time.

Both ends of the gear portion of the sectorial rack gear 210 include a protrusion 212 projecting radially outward from the gear portion. The protrusions 212 at both ends of the gear portion serve to limit the range of movement of the planetary gear 220 engaged with the gear portion. When the planetary gear 220 revolving around the stationary sectorial rack gear 210 comes into contact with the protrusion 212, further revolution or movement of the planetary gear 220 is obstructed.

The reflector steering mechanism 22, 24 according to one embodiment includes at least one rotary encoder (not shown). The planetary gear 220 may be prevented from being separated from the sectorial rack gear 210 by performing positional control based on the rotary encoder, while the protrusions 212 provided at both ends serve as secondary safety devices. The antenna of a mobile communication base station may be put in an unexpected situation due to lightning or the like, and it is often difficult to approach the installation position thereof. The protrusions 212 provided to the sectorial rack gear 210 are configured not to interfere with the assembled state even when a malfunction occurs, and enables self-reset and correction by software operation at a remote distance. For example, when the planetary gear 220 is stopped by contacting the protrusion 212, overload may be detected in the DC motor to confirm the limit position.

Figure 6:
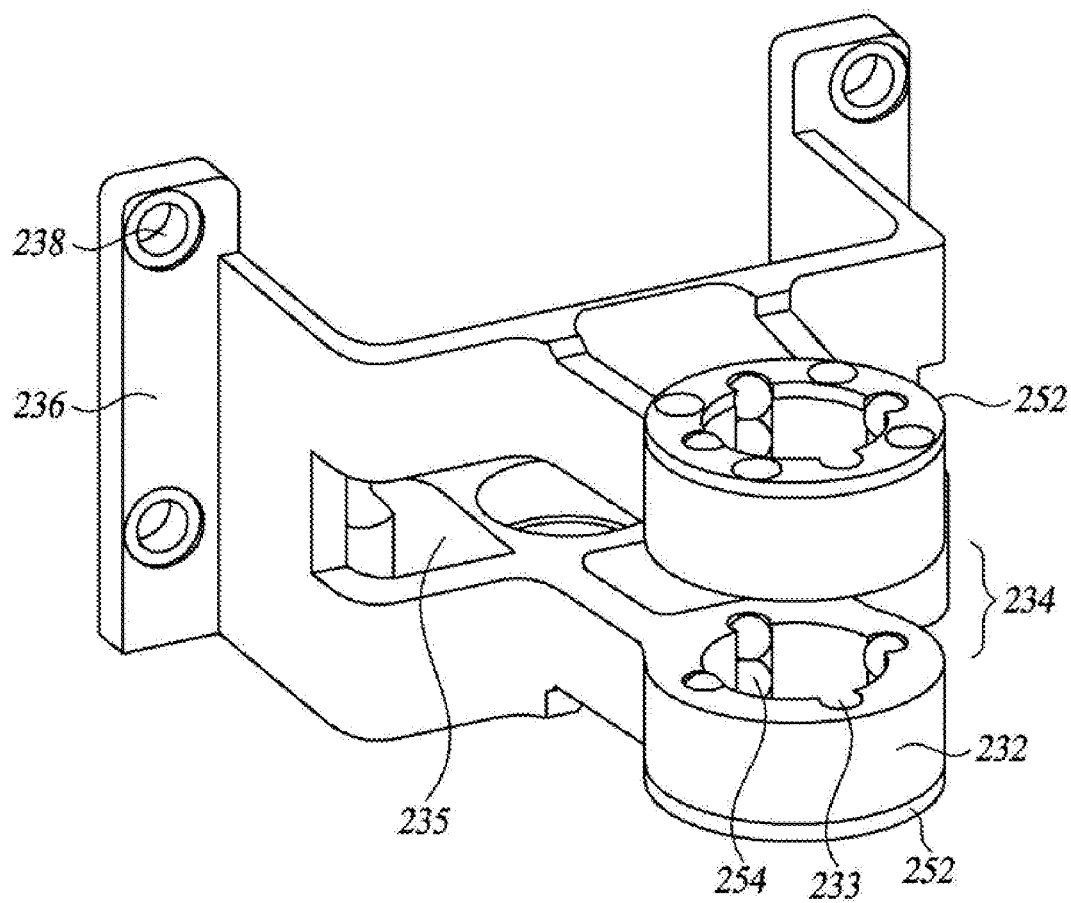
FIG. 6 is a perspective view showing a gear housing according to an embodiment of the present disclosure.

FIG. 6 is a perspective view showing a gear housing according to an embodiment of the present disclosure.

Referring to FIG. 6, the gear housing 230 may have a basic structure of a clevis or yoke. The gear housing 230 includes a pair of bosses 232 pivotably connected to the upper shaft 152 or the lower shaft 156, a cut-open part formed between the pair of bosses 232 to allow the sectorial rack gear 210 to be pivotably inserted thereinto, a motor coupling portion 235 to which the drive motor 260 is coupled, and a fixing portion 236 for fixing the gear housing 230 to the rear surface of the reflector 110.

The inner circumferential surface of the boss 232 is provided with three or four columns of grooves 233 formed in the axial direction. A plurality of ball bearings 254 is inserted into the grooves 233 and caps 252 are connected to both outer sides of the bosses 232 to prevent the ball bearings 254 from being separated. The ball bearings 254 are made of a nonconductive material to electrically insulate the gear housing 230 from the upper shaft 152 or the lower shaft 156 connected with the gear housing 230.

The ball bearings 254 serve as radial bearings. In addition, as the ball bearings 25 are arranged to protrude slightly toward the cut-open part 234, the ball bearings 25 may also serve as axial bearings when the gear housing 230 is rotated with respect to the sectorial rack gear 210. A washer of a nonconductive material may be inserted into both sides of the sectorial rack gear 210 to assist the bearings and support the axial load.

As described above, the antenna of the mobile communication base station needs to ensure very low noise. To this end, a high level of insulation may need to be implemented between the gear housing 230 and the upper shaft 152 or lower shaft 156 coupled thereto to minimize the PIMD. Particularly, like the engaged portions of the sectorial rack gear 210 and the planetary gear 220, it is preferable to exclude the bosses 232 and the bearing elements, which rotate together with the upper shaft 152 or the lower shaft 156, from electrical contact. It is an important technical feature to minimize the PIMD by blocking variation in contact between metal pieces.

The motor coupling portion 235 is disposed between the boss 232 and the fixing portion 236 of the gear housing 230 and is formed on one side surface of the gear housing 230. The gear housing 230 connected to the upper shaft 152 is disposed such that the motor coupling portion 235 faces upward and the gear housing 230 connected to the lower shaft 156 is disposed such that the motor coupling portion 235 faces downward. In one embodiment, only the motor 260 coupled to the gear housing 230 connected to the lower shaft 156 is equipped with the rotary encoder. The reflector steering mechanisms 22 and 24 are steered by controlling the drive motors 260 mounted on the upper and lower sides by the RET controller. The drive motor 260 is preferably a DC motor capable of generating a high torque at a low speed. A speed reducer may be further arranged between the drive motor 260 and the planetary gear 220 to increase the reduction ratio.

An insulating insert and an insulating tape 112 are inserted into the fixing hole 238 of the fixing portion 236 of the gear housing 230 such that the gear housing 230 and the reflector 110 are fixed while being electrically insulated from each other.

Figure 7:
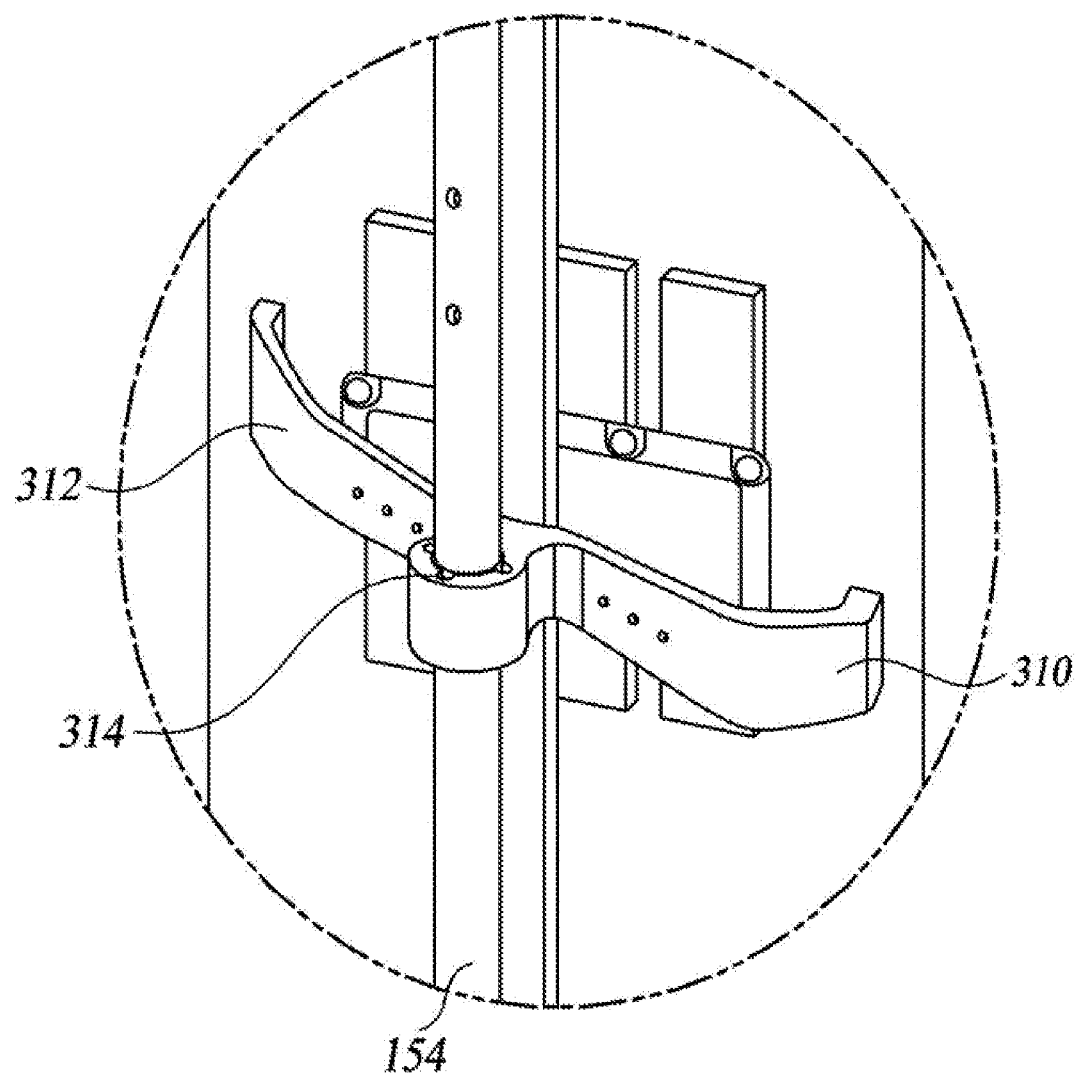
FIG. 7 is a perspective view showing an auxiliary bracket according to an embodiment of the present disclosure.

FIG. 7 is a perspective view showing an auxiliary bracket according to an embodiment of the present disclosure.

Referring to FIG. 7, the intermediate shaft 154 may include at least one auxiliary bracket 310. The auxiliary bracket 310 may be fixed to the rear surface of the reflector 110 by a pair of arms 312 pivotably connected to the intermediate shaft 154 and formed to have a width smaller than that of the reflector 110. The intermediate shaft 154 and the pivot portion of the auxiliary bracket 310 may include a roller bearing 314 for reducing frictional resistance caused by rotation of the auxiliary bracket 310. Typical steel ball bearings may be used. Preferably, bearings capable of electrically insulating the shaft from the bracket, such as ceramic ball bearings or polymer ball bearings, are used.

Although exemplary embodiments have been described for illustrative purposes, those skilled in the art will appreciate that and various modifications and changes are possible, without departing from the idea and scope of the embodiments. Exemplary embodiments have been described for the sake of brevity and clarity. Accordingly, one of ordinary skill would understand that the scope of the embodiments is not limited by the explicitly described above embodiments but is inclusive of the claims and equivalents thereof.

CROSS-REFERENCE TO RELATED APPLICATION

This application claims priority, under 35 U.S.C. § 119(a), to Patent Application No. 10-2017-0012671, filed on Jan. 26, 2017 in Korea, the entire contents of which are incorporated herein by reference. In addition, this patent application claims priority in countries other than the United States for the same reason as above, and the entire contents thereof are incorporated herein by reference.

The invention claimed is:

1. An antenna assembly comprising:
a reflector having an antenna element disposed on a front surface thereof;
a support shaft spaced apart from the reflector; and
an antenna reflector steering mechanism configured to pivot the reflector about the support shaft,
wherein the antenna reflector steering mechanism comprises:
a sectorial rack gear coupled to the support shaft and provided with a sectorial gear portion on an outer circumferential surface thereof;
a planetary gear engaging with the sectorial rack gear;
a gear housing provided with at least one boss arranged on one side thereof and rotatably connected to the support shaft and a fixing portion arranged on an opposite side thereof and coupled with a rear surface of the reflector; and
a drive motor fixed to the gear housing and connected to the planetary gear to revolve the planetary gear around the support shaft along the sectorial rack gear,
wherein the antenna reflector steering mechanism comprises:
a steering mechanism unit arranged on an upper portion of the reflector with respect to a height of the reflector; and
a steering mechanism unit arranged on a lower portion of the reflector.

2. The antenna assembly of claim 1, wherein the sectorial rack gear comprises a protrusion at both ends of the sectorial gear portion,
wherein the protrusion is configured to prevent the planetary gear from being separated.

3. The antenna assembly of claim 1, wherein the planetary gear comprises an insulation band surrounding a circumferential surface thereof,
wherein the insulation band is flexible so as to be deformed along a curved profile of engaged portions of the planetary gear and the sectorial rack gear.

4. The antenna assembly of claim 3, wherein the insulation band is formed of a material selected from the group consisting of fluorine resin and ultra-high molecular weight polyethylene.

5. The antenna assembly of claim 1, wherein the sectorial gear and the planetary gear are formed of aluminum, and a surface thereof is anodized.

6. The antenna assembly of claim 1, wherein the gear housing is formed in a clevis shape such that two bosses disposed on one side are rotatably connected to the support shaft and the sectorial rack gear is accommodated between the two bosses.

7. The antenna assembly of claim 1, wherein the gear housing further comprises:
an insulation insert and an insulation tape for electrically insulating the fixing portion when the fixing portion is fixed to the rear surface of the reflector.

8. The antenna assembly of claim 1, wherein the boss of the gear housing comprises:
three or more columns of grooves formed on an inner circumferential surface of the boss and arranged in an axial direction of the boss; and
a plurality of ball bearings of a nonconductive material accommodated in the grooves.

9. The antenna assembly of claim 8, wherein the ball bearings are formed of a material selected from the group consisting of a polymer material and a ceramic material.

10. The antenna assembly of claim 8, wherein a size and number of the ball bearings are determined so as to serve as axial and radial bearings to reduce rotational resistance of the gear housing when the gear housing is pivoted about the support shaft.

11. The antenna assembly of claim 1, wherein the support shaft comprises:
an upper shaft;
a lower shaft; and
an intermediate shaft disposed between the upper shaft and the lower shaft and coupled to the upper shaft and the lower shaft by a coupling.

12. The antenna assembly of claim 11, wherein the coupling electrically insulates the shafts connected to both sides thereof.

13. The antenna assembly of claim 1, wherein the drive motor is a direct current (DC) motor.

14. The antenna assembly of claim 1, wherein the drive motor comprises at least one rotary encoder,
wherein the drive motor is controlled by a remote electric tilt (RET) controller.

15. The antenna assembly of claim 1, further comprising:
an auxiliary bracket comprising a body allowing the support shaft to pass therethrough and an arm extending from both sides of the body to lateral sides of the reflector such that ends thereof are fixed to the reflector.

16. A mobile communication base station antenna comprising three antenna assemblies of claim 1, wherein each of the three antenna assemblies is disposed in each sector of a circumference divided into three sectors.

* * * * *